Feb. 20, 1968     R. J. BELLIVEAU     3,370,155
ENVIRONMENTAL STRESS: STRAIN TEST CHAMBER
Filed Sept. 8, 1964
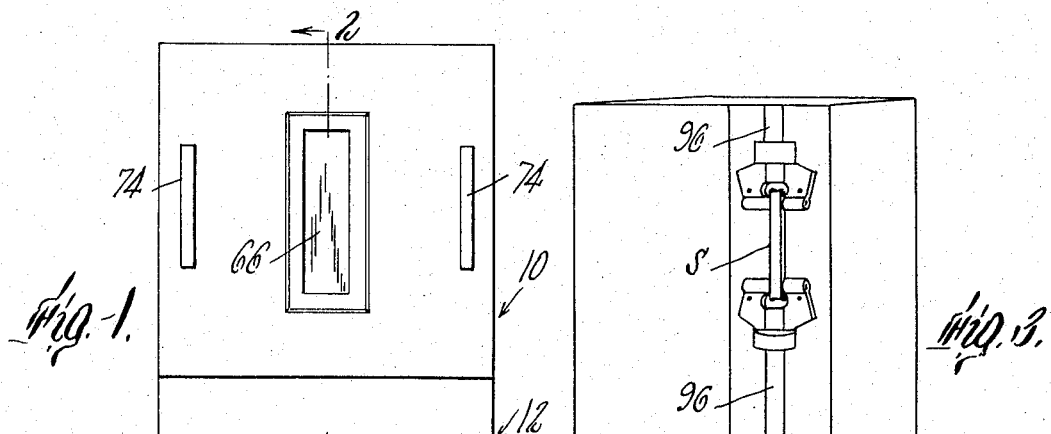
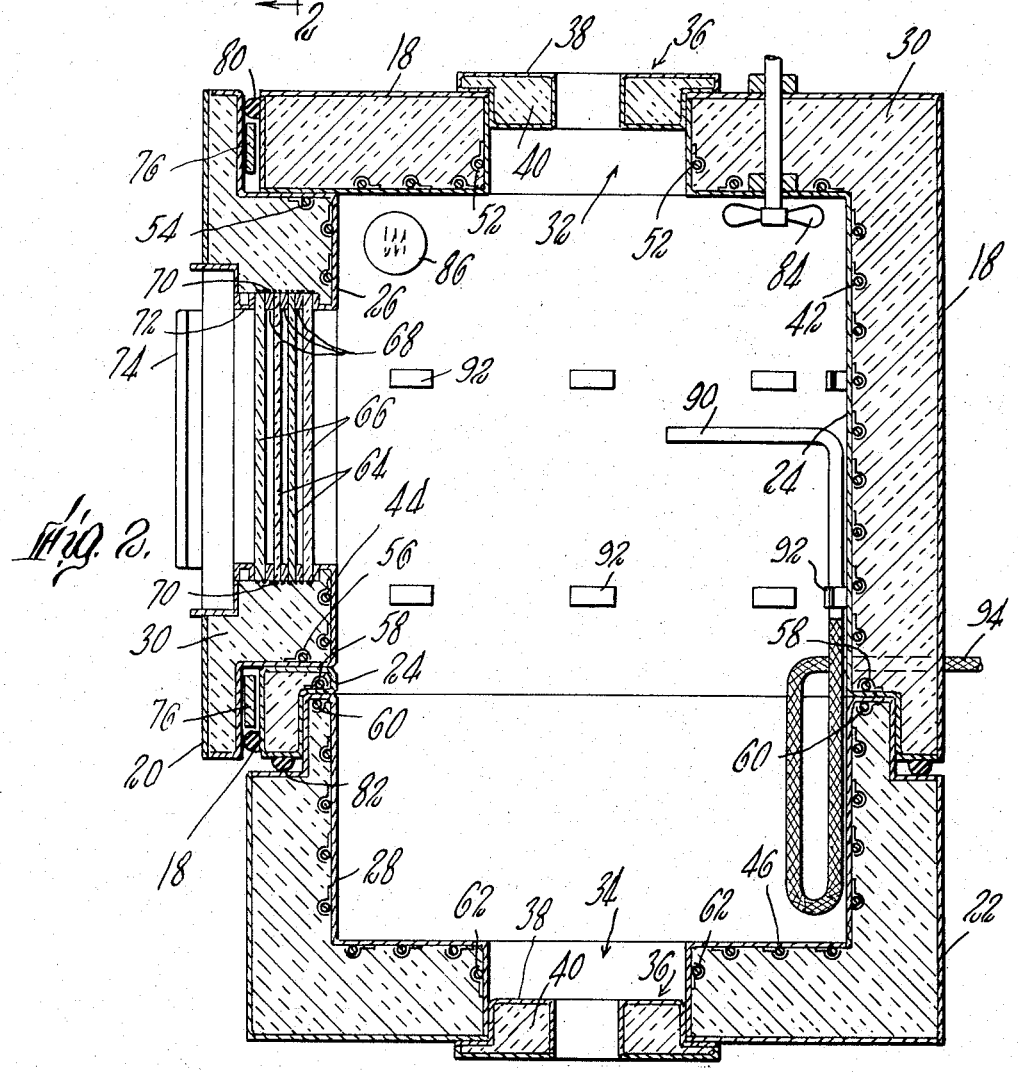

3,370,155
ENVIRONMENTAL STRESS:STRAIN
TEST CHAMBER
Robert J. Belliveau, South Weymouth, Mass., assignor to Instron Corporation, Canton, Mass., a corporation of Massachusetts
Filed Sept. 8, 1964, Ser. No. 394,788
3 Claims. (Cl. 219—406)

ABSTRACT OF THE DISCLOSURE

An environmental test chamber comprising a housing, a door, and heating apparatus, the door and housing each having an insulating layer and a metal skin, portions of the housing and door metal skin being adjacent to form a joint, the housing including a pair of opposed openings therethrough, and the heating apparatus being oriented to distribute heat evenly over the metal skin outside the joint and including supplementary heating devices for heating the metal skin portions around the joint and the openings.

---

This invention relates to materials testing equipment, and more particularly to environmental test chambers especially useful in stress:strain testing of specimens at selected temperature conditions.

It is a primary object of the invention to provide such chambers in which temperature throughout the space enclosed thereby is highly uniform and stable. Further objects are to provide such chambers which make possible accurate measurement of the temperature of a specimen by radiation to a probe out of contact with the specimen, to provide for uniform temperature along the length of a specimen, and to provide for rapid heating of the chamber and of any new specimen introduced thereinto, yet with efficiently low power requirements.

Generally speaking, the invention contemplates a radiantly-heated environmental testing chamber with opposed openings for movement therethrough relative to each other of rods operatively stressing a specimen in the chamber in which extending generally uniformly over all six walls defining the enclosure are heating units. Also contemplated as further contributing to wall temperature uniformity, particularly in preferred embodiments, are supplementary provisions, particularly supplementary heating units along joints to combat conductive heat losses thereat, and including as well heat reflective glass in the small window of the chamber door.

Other objects, features, and advantages will appear from the following description of a preferred embodiment, taken with the attached drawings thereof, in which:

FIG. 1 is a front elevation of said embodiment;
FIG. 2 is a section at 2—2 of FIG. 1; and
FIG. 3 is a diagrammatic isometric view of the interior of said embodiment with a specimen in position for testing.

Referring now more particularly to the drawings, there is shown an environmental stress:strain test chamber with a main portion indicated generally at 10 and an extension indicated generally at 12.

This embodiment is shown in greater detail in FIG. 2. The main portion 10 is provided with an outer skin 18 (and over the door skin 20) of cold rolled steel, while the extension 12 has a similar outer skin 22. The inner skins 24, 26, and 28 are of stainles steel. In every instance between inner and outer skins is a thick insulating layer of insulating fiber glass 30. The upper wall of the main portion 10 and the lower wall of the extension 12 include coaxial holes indicated generally at 32 and 34, in which are seated plugs indicated generally at 36, and formed of a stainless steel skin 38 surrounding an insulating body 40 of cast insulating material sold by Johns-Manville Company under the name "Min-K."

Disposed generally uniformly over the outer surfaces of those portions of the stainless steel skins 24, 26, and 28 the inner surfaces of which define the enclosure within the test chamber is electrical resistance heating wire 42, 44, and 46.

I have discovered that despite this generally uniform application of heat to the enclosure surfaces thereover, relatively cold spots would be produced in the vicinity of the joints and openings, at which a metal skin extends from the inner or enclosure surfaces to the outside, so that there are accordingly breaks in wall insulation and substantial heat leaks. Such colder spots very adversely affected precision testing, since there was radiation interaction between them and a specimen and temperature probe 90 as well as between the hotter wall portions and said specimen and probe. The result was lack of uniformity of specimen temperature and lack of precise specimen temperature control and measurement. I have found that this unfortunate result can be overcome by heating the metal portions running between the enclosure and the outside of the chamber, as by supplemental electrical resistance wire heating elements 52, 54, 56, 58, 60, and 62.

It has further been found that uniformity can be maximized by providing a pair of inner infrared reflective glass sheets 64 between tempered glass sheets 66 in the door, indicated generally at 68. The sheets 64 and 66 are each separated from the adjacent sheet by an aluminum spacer 68, and silicone rubber 70 is not only surrounding the outer edges but is between each sheet and spacer (not there shown), to provide gas-tight sealing. (Capillaries, not shown, connect the air spaces between the sheets of glass, to minimize pressure stress on the inner sheet owing to temperature change in the chamber.) Uniformity of temperature is further aided by tapering the window defined by the four sheets of glass from an outer width of about 4 inches to an inner width of about 2 inches (not shown), although the height is not tapered. Plastic spacer 72 inhibits heat transfer from the outer sheet of glass to the door outer skin 20.

The door may be opened using handles 74 on a parallel hinge mounting including the portions 76, which keep the hot side of the door away from the user at all times. Silicone rubber gaskets 80 and 82 are provided around the door opening and between main portion 10 and extension 12.

The extension 12 may be replaced by a shorter unit serving in effect merely as a similarly insulated end closure, in uses when less enclosure height is required, as where testing specimens in compression rather than in tension.

Fan 84 is of low thrust so as not to affect fragile specimens, and breaks up any convective currents that may naturally arise. Light 86 may be selectively turned on by means not shown. In the preferred embodiment, means (not shown) to automatically cut off heat when the door is opened, and also to cut off heat if enclosure skin temperature exceeds a safe figure, is provided.

Temperature probe 90 comprises a stainless steel sheath in which are mounted a 3-wire resistance thermometer which automatically controls power input to produce a predetermined desired temperature and a thermocouple which actuates an indicating pyrometer (not shown). The probe can be mounted in any of spring clips 92, and may be moved vertically or rotatably in any thereof, for great flexibility in positioning, flexible cable 94 contributing of course to this capability. The probe has about a one-minute time constant, so that it is not affected by any small shortly transient temperature variation, and accurately reflects adjacent specimen temperature by virtue of mutual radiation therewith to equilibrium, both being in turn in radiation equilibrium with all portions of the enclosure walls.

FIG. 3 is a diagrammatic view of the enclosure in use. The relatively movable members 96, which are here the pull rods of a tensile testing machine, extend through fairly closely fitting holes in the insulating caps 40, and any gap is stuffed by hand on set-up with fiber glass (not shown).

I have thus provided the art with an environmental stress:strain testing chamber with great advantages, meeting the objects above set forth, and providing a research tool with a sensitivity unparalleled in what has heretofore been known in the art.

I claim:

1. An environmental test chamber comprising a housing, a door, and heating apparatus, said door comprising an insulating layer and a metal skin and said housing comprising an insulating layer and a metal skin and including a pair of opposed openings therethrough defined by said housing metal skin and said metal skin thereat being in heat-conductive relationship with ambient, said housing metal skin and said door metal skin being adjacent to form a joint over part of each thereof, each said metal skin being insulated by the respective said insulating layer outside said joint, said heating apparatus being oriented to distribute heat evenly over said metal skin outside said joint, and including a first supplementary heating device to heat said metal skins in said joint therearound, and second supplementary heating devices oriented to supply heat to said metal skin therearound in said openings.

2. The chamber of claim 1 in which said housing is in two portions, said housing metal skin of one of said portions being adjacent to said housing metal skin of the other of said portions to form a joint thereat at which said metal skin is not insulated by the housing insulating layer, and which includes a supplementary heating device to heat said housing metal skin at said last-mentioned joint therearound.

3. The chamber of claim 2 which includes a low-thrust fan.

References Cited

UNITED STATES PATENTS

| | | | |
|---|---|---|---|
| 2,415,768 | 2/1947 | Shaw | 219—395 |
| 2,647,393 | 8/1953 | Stewart | 73—15.6 |
| 2,748,597 | 6/1956 | Kooistra | 73—15.6 |
| 2,848,591 | 8/1958 | Taylor | 219—342 |
| 2,904,993 | 9/1959 | Grover et al. | 73—15.6 |
| 3,088,453 | 5/1963 | Grahn et al. | 126—200 |
| 3,092,706 | 6/1963 | Chisholm | 219—396 |
| 3,192,575 | 7/1965 | Rosenau et al. | 126—200 |
| 3,094,605 | 6/1963 | Welch | 219—396 |

JAMES J. GILL, *Primary Examiner.*

R. C. QUEISSER, *Examiner.*

J. GOLDSTEIN, *Assistant Examiner.*